UNITED STATES PATENT OFFICE.

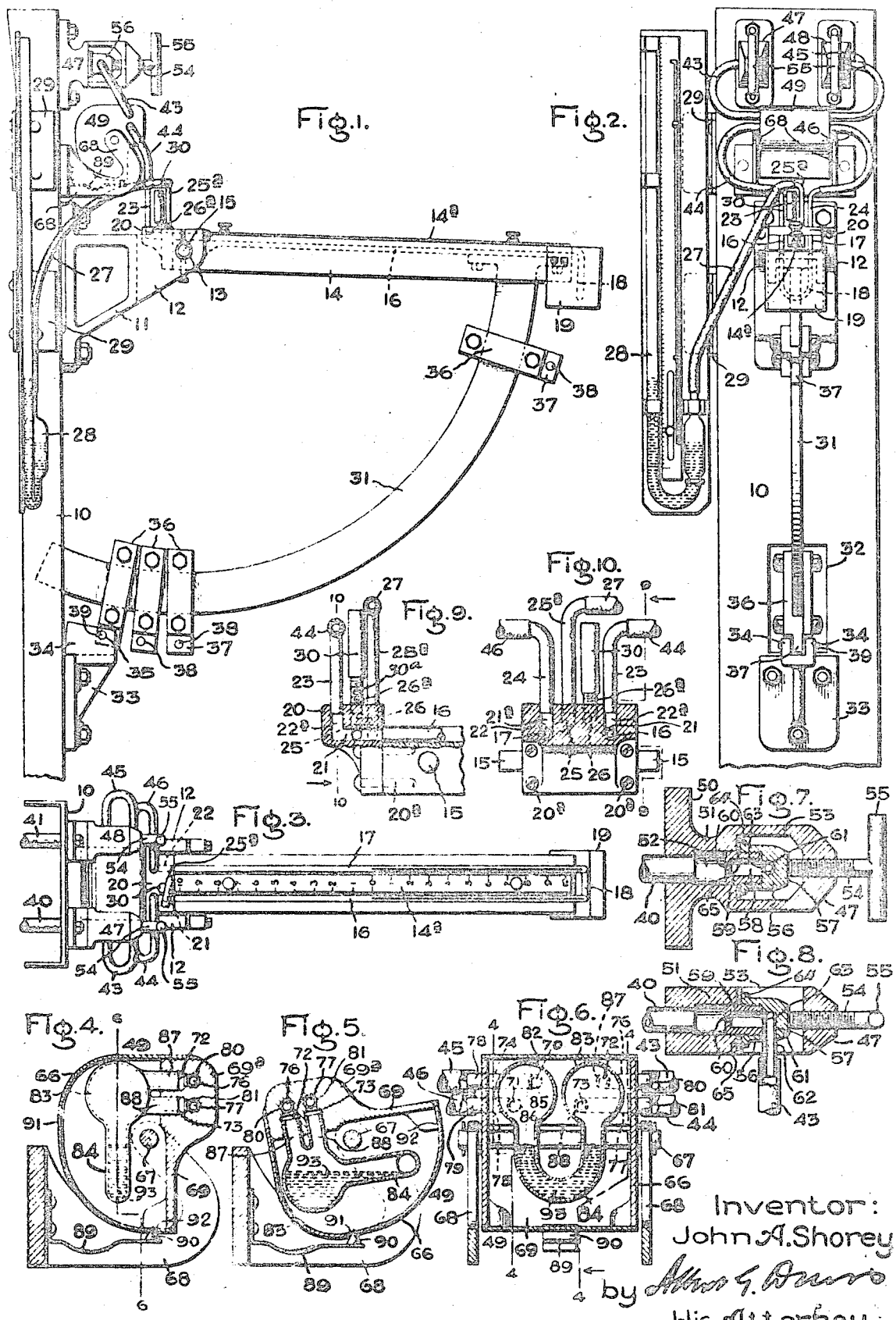
J. A. SHOREY.
FLOW METER.
APPLICATION FILED DEC. 26, 1916.
1,301,182. Patented Apr. 22, 1919.
Inventor:
John A. Shorey
His Attorney.

JOHN A. SHOREY, OF NEW YORK, N. Y., ASSIGNOR TO GENERAL ELECTRIC COMPANY, A CORPORATION OF NEW YORK.

FLOW-METER.

1,301,182.   Specification of Letters Patent.   Patented Apr. 22, 1919.

Application filed December 26, 1916. Serial No. 138,848.

*To all whom it may concern:*

Be it known that I, JOHN A. SHOREY, a citizen of the United States, residing at New York, county of New York, in the State of New York, have invented certain new and useful Improvements in Flow-Meters, of which the following is a specification.

The present invention relates to flow meters such as are used for measuring the flow of fluids through conduits and particularly to the type of meter which comprises a U-tube containing an indicating fluid, the tube having its two legs connected with a suitable device, as a Pitot tube or Venturi tube, which creates a pressure difference which varies with the rate of flow.

The object of the invention is to provide an improved structure and arrangement in a meter of this type which will be very sensitive and accurate and which finds particular utility in measuring small pressure differences.

For a consideration of what I believe to be novel and my invention, attention is directed to the accompanying specification and the claims appended thereto.

In the drawing, Figure 1 is a side elevation of an instrument embodying my invention; Fig. 2 is an end view thereof; Fig. 3 is a top plan view; Fig. 4 is a sectional view of a part of the meter, the section being taken on line 4—4, Fig. 6; Fig. 5 is a view of the same parts as those of Fig. 4 but in a different adjusted position; Fig. 6 is a section taken on line 6—6, Fig. 4; Figs. 7 and 8 are sectional views of a detail, the sections being taken at right angles to each other, and Figs. 9 and 10 are sectional views of a detail, the section of Fig. 9 being taken on line 9—9, Fig. 10, and the section of Fig. 10 being taken on line 10—10, Fig. 9.

Referring to the drawing, 10 indicates a support upon which is mounted a suitable bracket 11 having a pair of ears 12 provided with bearing openings 13. 14 indicates a rectangular base pivoted at one end to bracket 11, it being provided with trunnions 15 located in openings 13. The rectangular base may advantageously be formed of an angle beam as shown and is provided in its upper surface with two parallel longitudinally extending grooves in which are embedded the two legs 16 and 17 of a U-tube which is preferably formed of glass. The ends of the legs of the U-tube which are joined together are bent at right angles to the plane of the legs to form an angle portion 18 which is embedded in a block 19 fixed to the base 14. The purpose of angle portion 18 is to provide a substantial vertical height for the U-tube when the two legs 16 and 17 make a small angle with the horizontal so that the indicating liquid will not be forced entirely out of the U-tube in case a pressure difference occurs greater than that for which the instrument with the particular setting is intended. It is desirable that the two legs 16 and 17 lie as nearly as possible in the same horizontal plane and they should be located accordingly in the grooves by means of shims and then grouted into place with litharge and glycerin. Between the legs 16 and 17 is fastened a plate 14$^a$ upon which a scale is marked. On the end of the base 14 adjacent its pivot is fixed a head 20, which may be suitably bolted into place by bolts 20$^a$ and in which are horizontal openings 21 and 22 into which the ends of the two legs 16 and 17 are fixed; (see Figs. 9 and 10). Communicating with the horizontal openings are vertical openings 21$^a$ and 22$^a$ into which are fixed the two tubes 23 and 24. The tube 23 thus communicates with the leg 16 of the U-tube and the tube 24 with the leg 17 thereof. In the head 20 is also an opening 25 through which a tube 25$^a$ communicates with the leg 17, and an opening 26 through which a tube 26$^a$ communicates with the leg 16. The tube 25$^a$ is connected by a flexible tube 27, as a piece of rubber hose, with a suitable manometer 28 carried by brackets 29 on the support 10. The tube 26$^a$ serves as a filling tube and it is closed by a screw cap 30. The tube may advantageously be formed with a filling opening in its side as shown at 30$^a$, Fig. 9 so that the cap need not be turned entirely off for filling but only until it uncovers the opening. In this figure, the cap 30 is shown as being screwed up to uncover opening 30$^a$.

The outer end of the base 14 is supported by a curved arm 31 the free end of which projects through an opening 32 in the support. Just below the opening 32 is a bracket 33 having a pair of spaced ears 34 which project about the lower edge of such opening and have holes 35 therein. Clamped on the curved arm 31 are a number of adjustable members 36 having lugs 37 provided with openings 38. These lugs are adapted to pass between the ears 34 to bring the openings 38 into registry with the holes 35, so that a pin 39 may be passed through them to hold the arm in fixed position. The members 36 are located on the arm at positions so that by connecting different ones to the ears 34, the base 14 may be adjusted to different angular positions with the horizontal.

Connected to the support 10 and leading rearwardly therefrom are two pressure conducting conduits or pipes 40 and 41. These, as is well understood, lead from a suitable pressure difference creating device, as a Venturi tube, a Pitot tube, or the like, and convey the trailing and leading pressures therefrom to the U-tube. The conduits 40 and 41 are placed in communication with the two tubes 23 and 24 by flexible conduits 43, 44 and 45, 46 which are detachably connected to the conduits 40 and 41, as indicated at 47 and 48 (Figs. 2 and 3) and which embody a liquid cut-off or short circuiting device 49 for the U-tube to be described presently. The detachable connections indicated at 47 and 48 are alike and one of them, for example 47, is shown in detail in Figs. 7 and 8. Referring to these figures, 50 indicates a base having a boss 51 thereon through which is a central opening 52 into which is fastened the end of the conduit 40. Supported by the boss 51 and preferably formed integral therewith is a U-shaped frame 53 through which is threaded a fastening bolt 54 having a handle 55 by which it may be turned. 56 indicates a head having a flat top 57 and a recess 58 into which threads a thimble 59 having a small opening 60 therein. The end of the thimble projects out beyond the head and is of a diameter to just fit the opening 52. Through the side of the head is a hole 61 which communicates on its side with the bottom of recess 58 and into which is fastened a short piece of pipe 62. The pipe 62 is preferably pushed entirely across the recess 58 so as to give a good strong connection, and has an opening 63 in its side through which it communicates with the recess. Fastened on the outer end of pipe 62 is the flexible conduit 43. The head 56 has a flange 64 to provide a substantial bearing surface, and between this flange and the boss 51 is arranged a large washer 65 of some flexible material, as rubber, the same fitting closely to the side of the thimble 59. When the head is in the position shown in Figs. 7 and 8 and the bolt 54 is screwed down against the flat top 57 thereof, a very firm, tight connection is obtained. The connection can be quickly and easily detached by screwing back the bolt 54 and lifting the head out by means of the short pipe 62 which serves as a handle. When lifted out the thimble 59 and washer 65 come with the head. This connector has the advantage that it is very easy to insert and remove, and cannot be gotten in wrong. Furthermore, since a wide bearing surface is provided, there is little or no danger that the head may be positioned at an angle, or not be firmly seated. The purpose of the thimble 69 with the small opening 60 therein is to provide a throttling orifice to temporarily reduce and control the pressure conveyed to the U-tube.

The liquid cut off or short circuiting device 49, shown in detail in Figs. 4, 5 and 6, comprises a casing 66 pivoted on a shaft 67 between two curved arms 68. One wall 69 of the casing 66 is formed with an enlarged portion 69ª in which are two pairs of openings 70, 71 and 72, 73, one pair toward each end thereof. These openings extend partially through the enlarged portion and meet openings 74, 75, and 76, 77 drilled at right angles thereto. In the openings 74, 75, 76 and 77 are fixed short pipe sections 78, 79, 80 and 81 over which slip the flexible tubes 43, 44, 45 and 46. 82 and 83 are two bulbs which may be formed of glass or other suitable material, and 84 is a curved U-tube connecting them. Projecting from each bulb 82 and 83 at right angles to the plane of the U-tube 84 are two short tubes 85, 86 and 87, 88 which fit into the openings 70, 71 and 72, 73 respectively, and are securely fastened therein. The casing 66 is arranged to be turned on the shaft 67 to bring the U-tube 84 into either a substantially vertical plane as shown in Fig. 4, or a substantially horizontal plane as shown in Fig. 5, and 89 is a spring catch having a pointed projection 90 adapted to engage openings 91 and 92 in the casing wall 66 to hold the U-tube 84 in either of the two positions. In the U-tube 84 is a suitable liquid 93. When the U-tube 84, which may be termed a short circuiting U-tube, is in the position shown in Figs. 4 and 6, it is connected in parallel with the U-tube comprising legs 16 and 17, which may be termed the main U-tube or measuring U-tube. The one pressure, as the trailing pressure, being conveyed from a pressure difference creating device by the conduit 40, passes through the connector 47, flexible conduit 43, pipe section 80, and projection 87 to bulb 83. Here the pressure acts on the liquid 93 in the one leg of the U-tube 84 and also, being conveyed by way of projection 88, pipe section 81, flexible conduit 44, and tube 23, acts on the liquid in the leg 16. The other pressure; i. e., the leading pressure, being conveyed from the pressure difference creating device by the conduit 41 passes through connector 48, flexible conduit 45, pipe section 78 and projection 85 to bulb 82. Here the pressure acts on the liquid 93 in the other leg of U-tube 84 and also, being conveyed by way of projection 86, pipe section 79, flexible conduit 46, and tube 24, acts on the liquid in the leg 17. The U-tube 84 has legs of such vertical height and the liquid 93 therein is of such specific gravity that with the greatest pressure difference to which the U-tubes are subjected the liquid 93 will not be deflected to such an extent that it will be spilled over into the connections between the bulbs 82 and 83 and the main U-tube comprising legs 16 and 17. The particular instrument illustrated is designed primarily for measuring the flow of air, and I at present prefer to use kerosene suitably colored with a dye as the indicating fluid for the main U-tube and mercury as the liquid for the short-circuit U-tube. As mercury has a much higher specific gravity than kerosene, the U-tube 84 need have but comparatively short legs in order to take care of the total deflections of the kerosene. During normal operation, the U-tube 84 is in the position shown in Figs. 4 and 6, and the pressures from the pressure difference creating device are conveyed to the legs 16 and 17 of the main or measuring U-tube, thus acting on the liquid in them to cause it to deflect and indicate the flow. The bulbs 82 and 83 and the U-tube 84 acts as a trap to catch any moisture or liquid particles carried over by the conduits 40 and 41. If, for any reason, it is desired to short circuit the measuring U-tube the casing 69 is turned from the position shown in Fig. 4 to that shown in Fig. 5, thus bringing the U-tube 84 from a substantially vertical position to a substantially horizontal one. The liquid 93 then flows into the bulbs 82 and 83 as shown in Fig. 5, the bulbs being sufficiently large to contain enough of the liquid so that the legs of the U-tube 84 connect directly the bulbs 82 and 83. When the short circuiting U-tube is in the Fig. 5 position, it will be seen that the pressure entering the bulb 82 can pass directly through the U-tube 84 to the bulb 83 and thence back to the pressure difference creating device. This, of course, short circuits the main or measuring U-tube and permits the indicating liquid therein to go to zero. This short circuiting of the main or measuring U-tube may be desirable in order to quickly test the same to see if there is the correct amount of indicating liquid in the legs 16 and 17 so that each stand exactly at zero. If such is found to be not the case then liquid may be introduced through the filling tube 26ª. This arrangement of short circuiting device has the advantage that it eliminates all valves or packings which are always a greater or less source of trouble due to leakage  The connections of the flexible tubings to the various parts may be very strongly and tightly made so that there is no danger of leaking through them.

When it is desired to test the calibration of the U-tube or to recalibrate it, the connections 47 and 48 are undone and one is connected to a suitable calibrating instrument as, for example, the calibrating instrument described and claimed in my application, Serial No. 138847 filed of even date herewith.

The arrangement of manometer shown and described has the advantage that it measures directly the pressure of the air being measured and is in a handy and advantageous position for being read at the same time as the meter. Suitable connections for pressure can then be made in determining the correct flow. The flow meter and manometer can be installed as a unit side by side and can be placed some distance from the conduit through which the fluid being metered flows.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. In a flow meter, the combination of a support, a base pivoted at one end to the support, said base being adjustable to different angular position, means for holding the base in such angular positions, a U-tube which lies on the base and is fixed thereto so as to take the same angular position as the base, pressure conducting conduits carried by the support, and flexible conduits connecting the two legs of the U-tube to said conducting conduits.

2. In a flow meter, the combination of a support, a base pivoted at one end to the support, said base being adjustable to different angular position, means for holding the base in such angular positions, a U-tube which lies on the base and is fixed thereto so as to take the same angular position as the base, pressure conducting conduits carried by the support, flexible conduits connecting the two legs of the U-tube to said conducting conduits, and a second U-tube connected in parallel to the first named U-tube, said second U-tube, when it contains no liquid, serving to short circuit the first named U-tube.

3. In a flow meter, the combination of a support, a base pivoted at one end to the support, said base being adjustable to different angular positions, means for holding the base in such angular positions, a U-tube carried by said base, a second U-tube pivotally mounted on said support, a liquid therein, conduits connecting said U-tubes in parallel to each other, said second named U-tube being adapted to be turned to such a position that the liquid in it does not shut off communication between its two legs.

4. In a flow meter, the combination of a support, a base pivoted thereon, said base being adjustable to different angular positions, a U-tube carried by the base, pressure conducting conduits carried by the support, flexible conduits detachably connecting the two legs of the U-tube to said conducting conduits, and means comprising a U-tube connected in parallel with the first named U-tube for short-circuiting the first-named U-tube.

5. In a flow meter, the combination of a base, a U-tube supported thereon, a second U-tube in parallel with the first, a liquid therein and means for turning said second named U-tube to a position where the liquid therein does not shut off communication between its legs to short circuit the first named U-tube.

6. In a flow meter, the combination of a base, a U-tube supported thereon and having an indicating fluid therein, a second U-tube connected in parallel with the first and containing a heavier fluid than the first named, and means for turning said second named U-tube to a position where the liquid therein does not shut off communication between the two legs of such U-tube to short circuit the first named U-tube.

7. In a flow meter, the combination of a U-tube, a bracket, a second U-tube pivoted on the bracket, a liquid therein and flexible conduits connecting said U-tube in parallel, said second named U-tube being adapted to be turned so that the liquid therein does not shut off communication between its two legs to short circuit the first named U-tube.

8. In a flow meter, the combination of a U-tube, a second U-tube, liquids in said U-tubes, bulbs to which the legs of the second U-tube are connected, flexible conduits connecting said bulbs to the legs of the first named U-tube whereby said two U-tubes are in parallel, and conduits connected with said bulbs for conveying a pressure difference thereto, said second named U-tube being adapted to be turned so that the liquid therein does not shut off communication between its two legs to short circuit the first named U-tube.

In witness whereof, I have hereunto set my hand this twenty-first day of December, 1916.

JOHN A. SHOREY.